United States Patent
Winter et al.

(10) Patent No.: US 11,220,982 B2
(45) Date of Patent: Jan. 11, 2022

(54) FLAP DEVICE

(71) Applicant: Friedrich Boysen GmbH & Co. KG, Altensteig (DE)

(72) Inventors: Hayri Winter, Neubulach (DE); Volker Roller, Simmersfeld (DE); Karl Stockinger, Ebhausen (DE)

(73) Assignee: FRIEDRICH BOYSEN GMBH & CO. KG, Altensteig (DE)

( * ) Notice: Subject to any disclaimer, the term of this patent is extended or adjusted under 35 U.S.C. 154(b) by 25 days.

(21) Appl. No.: 16/793,095

(22) Filed: Feb. 18, 2020

(65) Prior Publication Data
US 2020/0263640 A1 Aug. 20, 2020

(30) Foreign Application Priority Data
Feb. 18, 2019 (DE) .......................... 102019104018.3

(51) Int. Cl.
*F02M 26/70* (2016.01)
*F02D 9/04* (2006.01)
*F16K 1/22* (2006.01)

(52) U.S. Cl.
CPC .............. *F02M 26/70* (2016.02); *F02D 9/04* (2013.01); *F16K 1/221* (2013.01); *F01N 2240/36* (2013.01)

(58) Field of Classification Search
CPC ... F16K 1/22; F16K 1/221; F02D 9/04; F01N 2240/36
USPC ............. 60/324; 251/149, 297, 337, 129.01; 137/468, 315.23
See application file for complete search history.

(56) References Cited

U.S. PATENT DOCUMENTS

| | | | | |
|---|---|---|---|---|
| 4,645,180 A * | 2/1987 | Bregman | .................. | F16K 1/22 137/315.23 |
| 5,271,269 A * | 12/1993 | Rilling | .................... | F16K 1/221 338/98 |
| 5,492,097 A * | 2/1996 | Byram | ...................... | F02D 9/02 251/129.01 |
| 6,193,214 B1 * | 2/2001 | Schatz | ...................... | F16K 1/22 251/305 |
| 6,932,100 B2 * | 8/2005 | Martin | .................. | F16K 15/033 251/337 |

(Continued)

FOREIGN PATENT DOCUMENTS

| CN | 202431374 U | 9/2012 |
|---|---|---|
| DE | 10202096 A1 | 7/2003 |

(Continued)

*Primary Examiner* — Thai Ba Trieu
(74) *Attorney, Agent, or Firm* — Dickinson Wright PLLC

(57) ABSTRACT

The invention relates to a flap device for controlling a gas flow through a pipe, in particular to an exhaust gas flap device for an exhaust train of a motor vehicle, comprising at least one flap which is arranged in a flap housing, in particular in a tubular flap housing, rotatable, in particular rotatable by a drive unit, about an axis of rotation of a flap shaft between an open position and a closed position, with a spring means being provided which, on a rotation of the flap from the open position into the closed position, tangentially and/or radially elastically loads the flap shaft at the latest in the closed position of the flap, and with at least one section of the spring means being directly or indirectly rotationally fixedly connected to the flap housing with respect to a rotation about the axis of rotation.

22 Claims, 7 Drawing Sheets

(56) References Cited

U.S. PATENT DOCUMENTS

Figure 1:
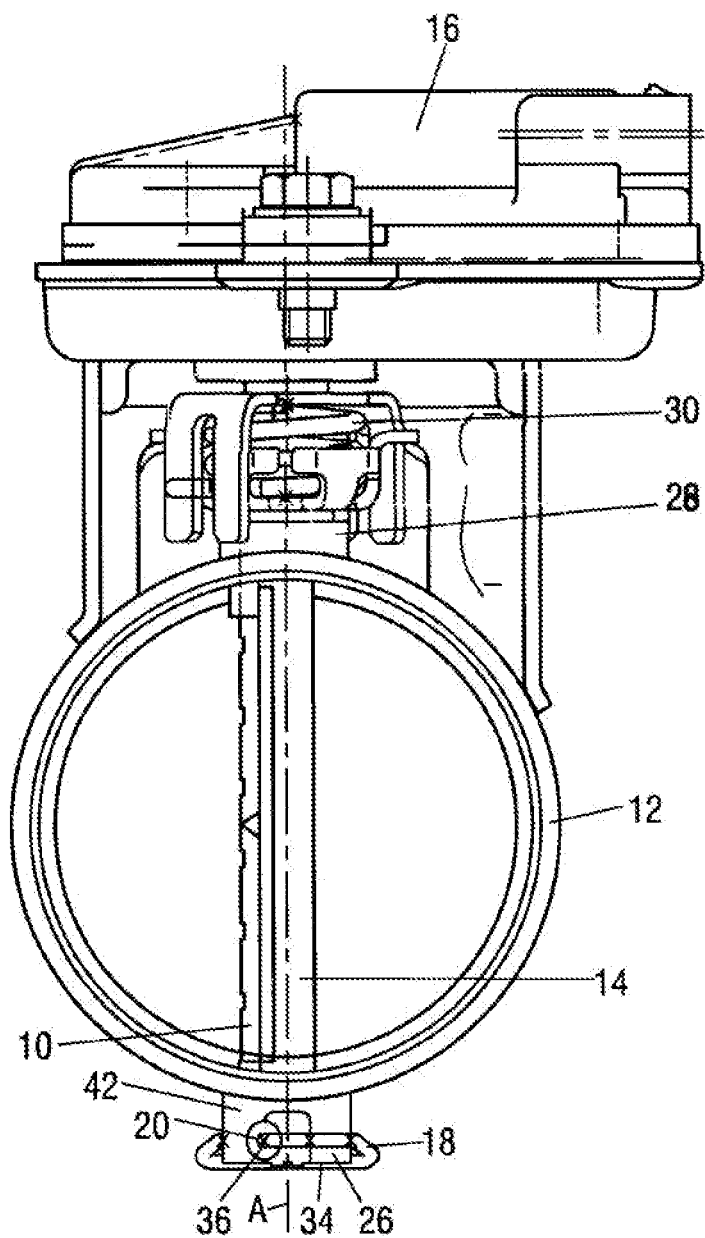

| | | | | |
|---|---|---|---|---|
| 6,986,336 B2* | 1/2006 | Tanimura | .............. | F02D 9/1065 123/343 |
| 7,310,942 B2* | 12/2007 | Shiga | ................... | F01N 1/166 60/324 |
| 7,566,046 B2* | 7/2009 | Muhr | ..................... | F01L 3/10 251/337 |
| 8,448,627 B2* | 5/2013 | Kondo | ................ | F02D 9/1065 123/399 |
| 9,038,987 B2* | 5/2015 | Hegner | ................ | F02D 9/106 251/305 |
| 10,480,659 B2* | 11/2019 | Schmitt | ................ | F02D 9/04 |
| 2008/0011269 A1 | 1/2008 | Tanimura et al. | | |
| 2008/0111092 A1* | 5/2008 | Komurian | ................ | F01P 7/14 251/149 |
| 2009/0277166 A1* | 11/2009 | Walz | ................... | F16K 15/144 60/324 |
| 2016/0084549 A1* | 3/2016 | Satake | ................ | F16K 27/0209 137/468 |
| 2016/0097574 A1* | 4/2016 | Kaneko | ................... | F16K 27/02 251/297 |
| 2017/0299074 A1* | 10/2017 | Masaki | ................ | F16K 27/0227 |
| 2018/0128189 A1* | 5/2018 | Varelis | ..................... | F02D 9/04 |
| 2021/0246841 A1* | 8/2021 | Edler | ........................ | F02D 9/04 |

FOREIGN PATENT DOCUMENTS

| | | | | |
|---|---|---|---|---|
| DE | 10334911 A1 | 2/2004 | | |
| DE | 602004006038 T2 | 1/2008 | | |
| DE | 102006048616 A1 | 4/2008 | | |
| DE | 102009013815 A1 * | 9/2010 | ............ | F16K 1/221 |
| DE | 102009013815 A1 | 9/2010 | | |
| DE | 102009016597 A1 * | 10/2010 | ............ | F16K 1/221 |
| DE | 102015221953 A1 | 5/2017 | | |
| JP | H02256837 A | 10/1990 | | |

* cited by examiner

FLAP DEVICE

CROSS-REFERENCES TO RELATED APPLICATIONS

This patent application claims the benefit of priority to German Patent Application No. 102019104018.3 filed Feb. 18, 2019, which are incorporated herein by reference in their entirety.

The present invention relates to a flap device for controlling a gas flow through a pipe, in particular to an exhaust gas flap device for an exhaust train of a motor vehicle, comprising at least one flap which is arranged in a flap housing, in particular in a tubular flap housing, rotatable, in particular rotatable by a drive unit, about an axis of rotation of a flap shaft between an open position and a closed position.

Such a flap device is generally known and is, for example, used in an exhaust train of a motor vehicle to influence an exhaust gas flow from an internal combustion engine by means of a flap, a so-called exhaust flap, arranged in a flap housing by the rotation of the flap between an open position and a closed position. For this purpose, the flap is rotatably supported about an axis of rotation of a flap shaft in at least one bearing.

The flap device is exposed to major temperature fluctuations, which typically range from −40° C. to 1000° C., during operation. So that the flap shaft is not canted or clamped by its thermal expansion at higher temperatures, the bearing has a comparatively large bearing play at lower temperatures so that the flap shaft can move to a certain degree with respect to its bearing position at lower temperatures.

Vibrations and pressure pulsations in the exhaust gas flow of the internal combustion engine can therefore stimulate the flap device, in particular the still cold flap and flap shaft, to perform oscillations, which is typically associated with an unwanted noise development.

It is an object of the invention to avoid an unwanted noise development.

This object is satisfied by a flap device having at least one flap which is arranged in a flap housing rotatable about an axis of rotation of a flap shaft between an open position and a closed position. The flap device in accordance with the invention is characterized by a spring means which, on a rotation of the flap from the open position into the closed position, tangentially and/or radially elastically loads the flap shaft at the latest in the closed position of the flap, with at least one section of the spring means being directly or indirectly rotationally fixedly connected to the flap housing with respect to a rotation about the axis of rotation.

It is the general idea underlying the invention to suppress or to at least damp an oscillatory movement of a flap of a flap device in that a spring force of a spring means rotationally fixedly connected to the flap housing is exerted on the flap shaft at the latest in its closed position such that the spring force of the spring means acts in a tangential direction and/or in a radial direction with respect to the axis of rotation of the flap shaft and in particular acts toward the axis of rotation. In other words, the flap shaft is tensioned without play at the latest in its closed position, whereby the flap shaft and the flap provided thereat can no longer be stimulated to oscillate or can at most be stimulated to oscillate only slightly or in damped form. The advantage results from this that disturbing noise produced by the oscillation of the flap shaft or of the flap is suppressed or at least reduced. At the same time, the spring-elastic design of the spring means makes it possible for the spring means to move along on a thermal expansion of the flap such that the flap is tensioned without play in its closed position without the risk of clamping both in a warm state and in a cold state.

Advantageous embodiments of the invention can be seen from description and from the enclosed drawings.

As a rule, a respective bearing for supporting the flap shaft is provided at oppositely disposed sides, in particular at end sections, of the flap shaft at the flap housing. The bearing remote from the drive unit is preferably a floating bearing and/or a radial bearing and/or an axial bearing. A spring means in accordance with the invention can be provided at the floating bearing and/or at the radial bearing and/or at the axial bearing, the spring means, on a rotation of the flap from the open position into the closed position, elastically loading the flap shaft at the latest in the closed position of the flap. The bearing adjacent to the drive unit can be a fixed bearing and/or a radial bearing and/or an axial bearing. Equally, the bearing remote from the drive unit can, vice versa, also be a fixed bearing and the bearing adjacent to the drive unit can be a floating bearing. In addition, not only the bearing remote from the drive unit, but also the bearing adjacent to the drive unit can have a spring means in accordance with the invention.

The spring means can already elastically load the flap shaft in an open position of the flap. In this case, the spring means applies a greater preload in the closed position of the flap than in the intermediate position or in the completely opened open position of the flap. However, it is preferred that the spring means only comes into engagement with the flap shaft in an intermediate position between the completely opened open position and the closed position, in particular just before the closed position; that is, the spring means does not load the flap shaft in the completely opened open position and in an adjoining first rotational range. This has the advantage that the flap shaft can be rotated in a largely unloaded manner. Since oscillations above all occur in the closed position, they can nevertheless be avoided. It must be noted in this connection that the flap is in particular rotated up to at least 90%, preferably up to at least 95%, and particularly preferably up to at least 99% from the open position in the direction of the closed position when the spring means loads the flap shaft.

If the spring means comes into engagement with the flap shaft on a rotation of the flap from the closed position into the open position, a spring force of the spring means can be exerted on the flap shaft in a tangential direction and/or in a radial direction with respect to the axis of rotation of the flap shaft. An effective damping or at best a complete suppression of oscillations of the flap shaft is hereby achieved.

The engagement of the spring means and the flap shaft thus enables a reliable suppression of a noise development due to oscillations of the flap shaft which in particular occur in the closed position.

For a particularly uniform loading of the flap shaft, the spring means axially symmetrically, mirror-symmetrically or rotationally symmetrically loads the flap shaft with respect to the axis of rotation.

A further improvement results when the spring means is axially preloaded with respect to the axis of rotation.

In accordance with an advantageous embodiment of the flap device, the spring means can have at least one spring arm which cooperates with the flap shaft on a rotation of the flap from the open position into the closed position and which is deflected against the spring force of the spring arm at the latest in the closed position of the flap shaft. The spring arm of the spring means can in particular be deflected further against its spring force in the closed position of the flap than in an open position of the flap.

In general, the spring means can be arranged within the flap housing. It is, however, of advantage for a simpler design of the flap device if the spring means is arranged outside the flap housing. So that the spring means can cooperate with the flap shaft, the flap shaft then preferably has a prolongation which is located outside the flap housing, in particular in a bearing region, and with which the spring means engages in a shape-matched and/or force-transmitting manner at least in the closed position of the flap.

The prolongation can be formed in one piece with the flap shaft. Alternatively, the prolongation can also be a component which is separate from the flap shaft and which is fastened to the flap shaft.

A particularly simple and inexpensive construction of the flap device can be achieved if the spring means is a separate component with respect to a bearing housing which accommodates a bearing for supporting the flap shaft. The spring means can be attached, in particular fixedly clamped, in a shape-matched and/or force transmitting manner to the bearing housing in order to fasten the spring means to the bearing housing. A spring arm of the spring means can engage into a recess of the bearing housing in so doing. The recess can be a groove into which the spring means is placed or clamped. The recess can moreover be a bore which penetrates through the bearing housing and through which the spring means is inserted.

However, the spring means can also be formed like a sleeve and can be placed onto the bearing housing. In this respect, the spring means preferably at least sectionally surrounds the bearing housing in a shape-matched and/or force-transmitting manner. The spring means can in particular at least sectionally radially surround the bearing housing with respect to the shaft axis of the flap shaft. The spring means preferably has a base body from which the spring arm projects. The base body can have the shape of a part ring or the shape of a ring and can at least sectionally surround the bearing housing. It must be noted at this point that the bearing housing can be designed in the form of a bearing bushing, for example.

The prolongation can have different shapes and designs. In accordance with an advantageous embodiment of the flap device, the prolongation can have a round cross-section, in particular a circular cross-section, with the prolongation being eccentrically aligned with respect to the axis of rotation of the flap shaft, and with the eccentric prolongation, on a rotation of the flap from the open position into the closed position, running onto a spring arm of the spring means and deflecting it against its spring force at the latest in the closed position.

In accordance with another advantageous embodiment of the prolongation, it defines a longitudinal extent and a short extent aligned transversely, in particular at a right angle, thereto. The prolongation can correspondingly have at least one long side and at least one short side. The prolongation can in particular have two oppositely disposed long sides and two oppositely disposed short sides.

In accordance with an advantageous embodiment of the prolongation, at least one long side is planar. A spring arm can hereby particularly easily engage with the prolongation in a shape-matched and/or force-transmitting manner at the latest in the closed position of the flap, in particular if the spring arm is likewise planar. An oscillatory movement of the flap shaft can hereby be suppressed or at least damped particularly easily.

Alternatively, at least one long side of the prolongation can be at least sectionally, in particular at the center of the long side, radially outwardly arched with respect to the axis of rotation of the flap shaft. If both long sides of the prolongation are arched, the short sides connecting the long sides can be curved more than the long sides. If all the sides of the prolongation are curved, the prolongation has an oval cross-section, in particular an elliptical cross-section, with respect to the axis of rotation of the flap shaft. A gradual deflection of a spring arm with an increasing preload of the spring arm is brought about by the arched sides of the prolongation.

However, it is also conceivable that at least one long side of the prolongation is not completely, but only sectionally radially outwardly arched. An intermediate section of the at least one long side is preferably radially outwardly arched with respect to the axis of rotation of the flap shaft, whereas the wing sections surrounding the intermediate section in the direction of the longitudinal extent of the prolongation can be planar. In such a design at the long side of the prolongation, a spring arm of the spring means can preferably already contact the arched intermediate section in a preloaded manner or be in force-transmitting engagement with the arched intermediate section in the open position of the flap, whereby the flap shaft is already sufficiently secured against an oscillatory movement of the flap and of the flap shaft in the open position. The spring arm, in particular an end face of the spring arm, in contrast presses toward a planar wing section in the closed position of the flap and thus secures the flap and the flap shaft against an unwanted oscillatory movement.

An oscillation-induced noise development of the flap device can preferably also be efficiently suppressed in that, at least in the closed position, at least one spring arm of the spring means is supported at a long side of the prolongation and is preloaded more than in the open position, with the longitudinal extent of the spring arm being aligned at least approximately in parallel with the longitudinal axis of the prolongation in the closed position. In the open position, the spring arm can in contrast be aligned at least approximately at a right angle to the longitudinal axis or to a long side of the prolongation.

Achieving the same effect, at least one spring arm can, at least in the closed position, be supported at a long side of the prolongation and can be preloaded more than in the open position in accordance with an alternative advantageous embodiment of the flap device, with the longitudinal extent of the spring arm being aligned at least approximately in parallel with the longitudinal axis of the prolongation in the open position.

A greater preload of the spring arm in the closed position compared to the open position is also to be understood such that the spring arm is not preloaded at all in the open position, i.e. the spring arm is not in engagement with the prolongation in the open position or only contacts it without being preloaded.

If the spring means is in engagement with the flap shaft, a uniform loading of the flap shaft can be achieved if the spring means has at least two spring arms which are aligned axially symmetrically with respect to the axis of rotation of the flap shaft. A uniform loading of the flap shaft can be achieved in a comparable manner if at least two spring arms are aligned mirror-symmetrically with respect to a central plane which includes the axis of rotation of the flap shaft. At least in the closed position, the two spring arms in this respect exert a force of at least approximately the same magnitude toward the prolongation if the respective spring force of each spring arm is at least approximately of the same magnitude.

The spring means can be manufactured by bending an elastic material. The spring means can in particular consist of a spring steel, in particular a wire-shaped spring steel. However, it is also conceivable that the spring means is produced from another elastic material. The spring means can, for example, also consist of rubber or of an elastic plastic.

In accordance with an advantageous embodiment of the flap device, the spring means is curved in a splint shape, with two spring arms facing away from a connection section connecting the spring arms. In accordance with another advantageous embodiment of the flap device, the spring means can also be curved in a heart shape, with ends of two spring arms facing toward a connection section connecting the spring arms. A further advantageous embodiment of the flap device provides that the spring means can be curved in a sigmoidal shape, with ends of two spring arms being aligned at least approximately at a right angle to a connection section connecting the spring arms.

The connection section can not only be configured to connect two spring arms, but can also serve to fixedly clamp the spring means to a bearing housing. The connection section can in particular be fixedly clamped in a groove of the bearing housing and the spring arms can each be inserted, preferably movably inserted, through a bore provided in the bearing housing.

In accordance with an advantageous embodiment of the flap device, the spring arms each define a longitudinal extent, with the spring arms each being deflected at least approximately at a right angle to their respective longitudinal extent against a first spring force in a first phase, in particular in an initial phase, of the rotation of the flap from the open position into its closed position and each being deflected at least approximately in their respective longitudinal extent against a second spring force in a second phase, in particular in an end phase, of the rotation of the flap from the open position into its closed position. In other words, the spring arms are radially deflected with respect to the axis of rotation of the flap shaft in the completely opened open position of the flap and are tangentially deflected with respect to the axis of rotation of the flap shaft in the closed position of the flap. In this respect, the second spring force can be greater than the first spring force such that a noise development of the flap device is in particular effectively suppressed in the closed position of the flap.

So that the spring arm can be deflected against a second spring force in the direction of its longitudinal extent, the at least one spring arm advantageously merges into a resilient arcuate section against whose spring force the spring arm is deflected at the latest in the second phase of the rotation of the flap. The arcuate section is preferably curved in a plane which is aligned at least approximately perpendicular to the axis of rotation of the flap shaft. The arcuate section can, however, also be curved in a plane which is aligned transversely to, in particular in parallel with, the axis of rotation of the flap shaft.

Figure 2:
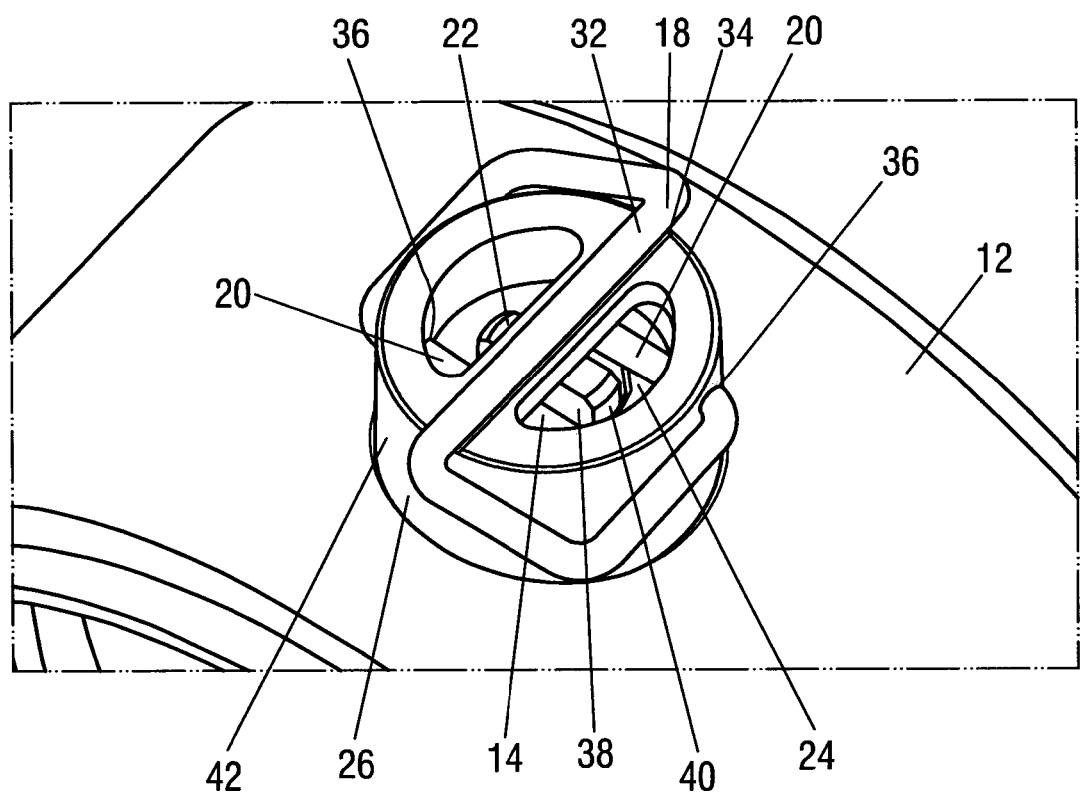
Figure 3:
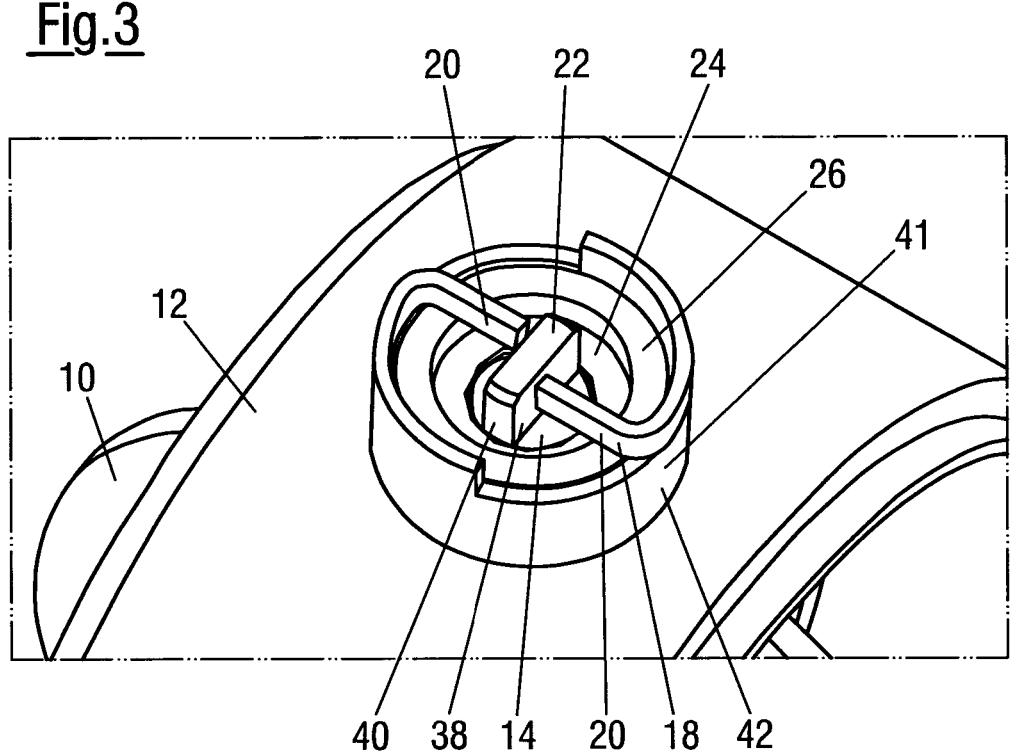
Figure 4:
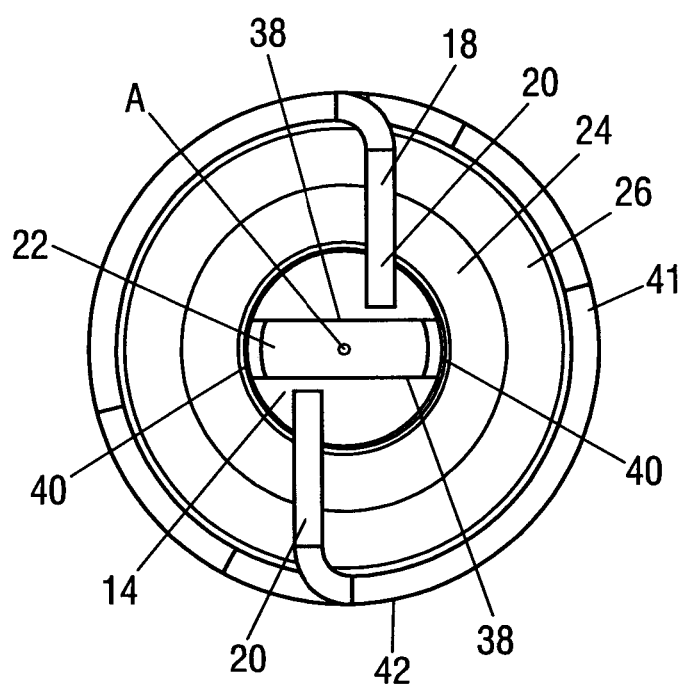
Figure 5:
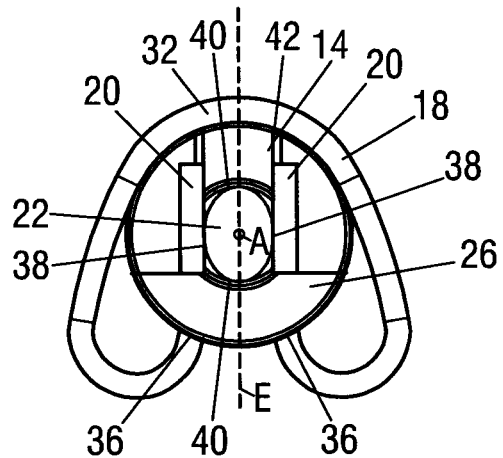
Figure 6:
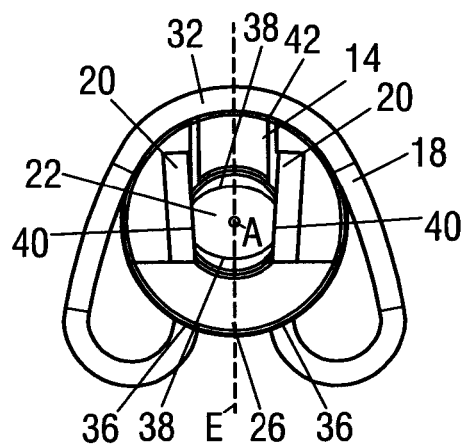
Figure 7:
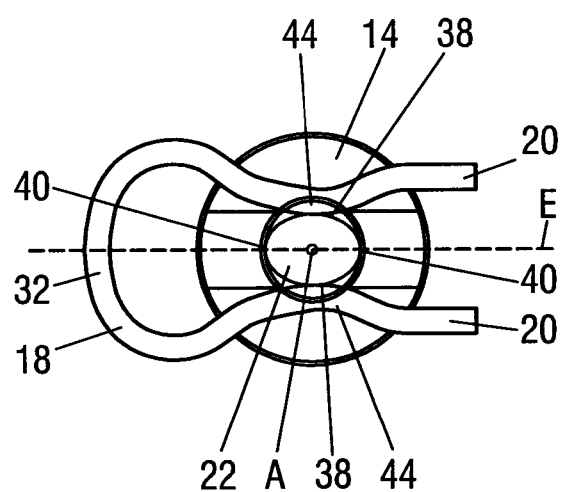
Figure 8:
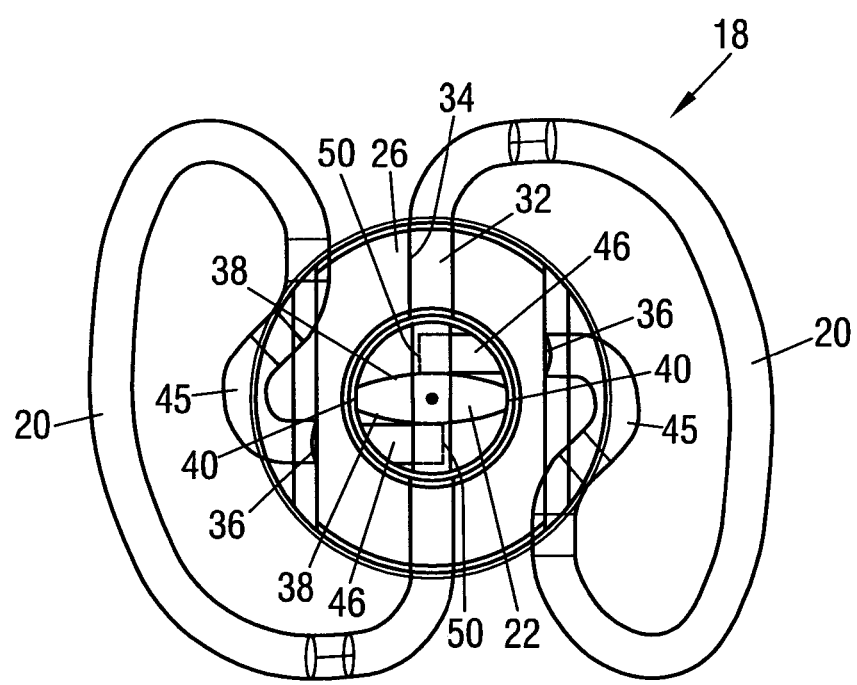
Figure 9:
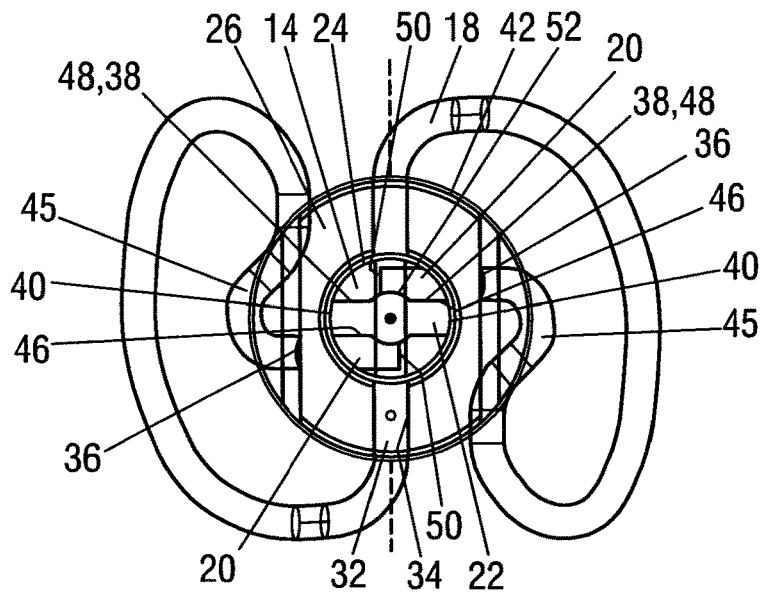
Figure 10:
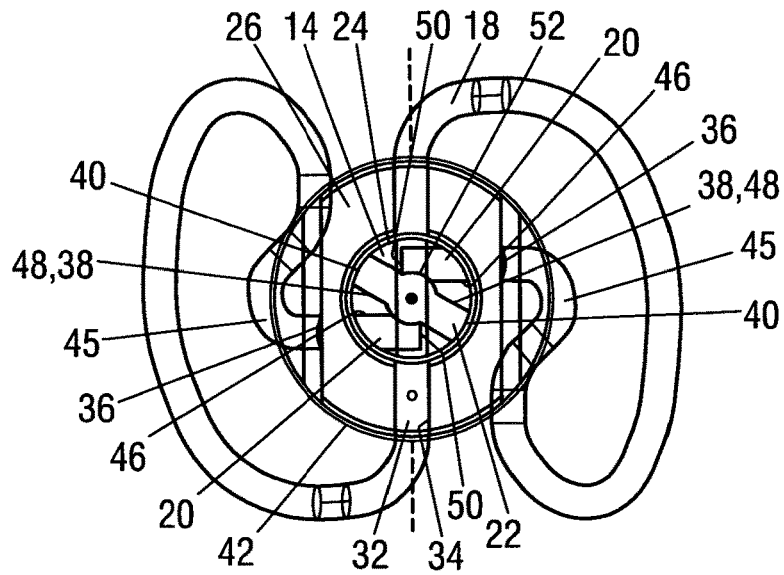
Figure 11:
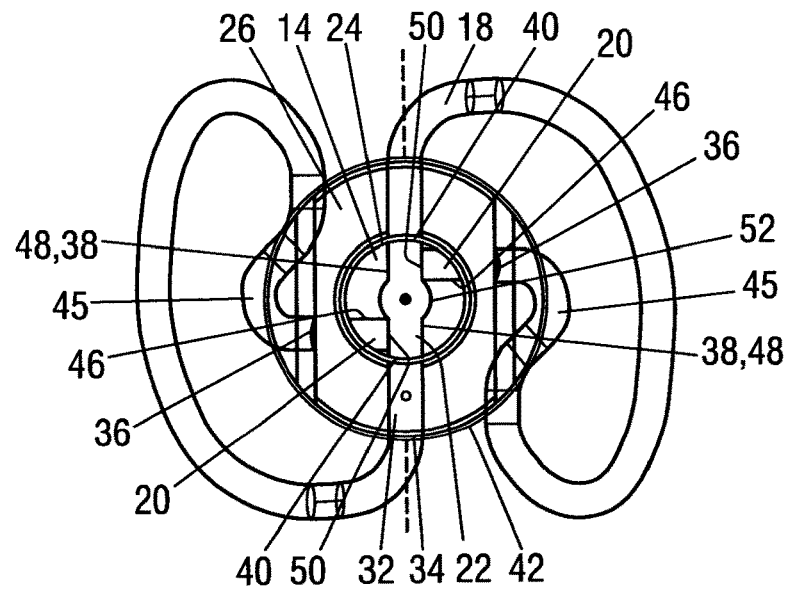
Figure 12:
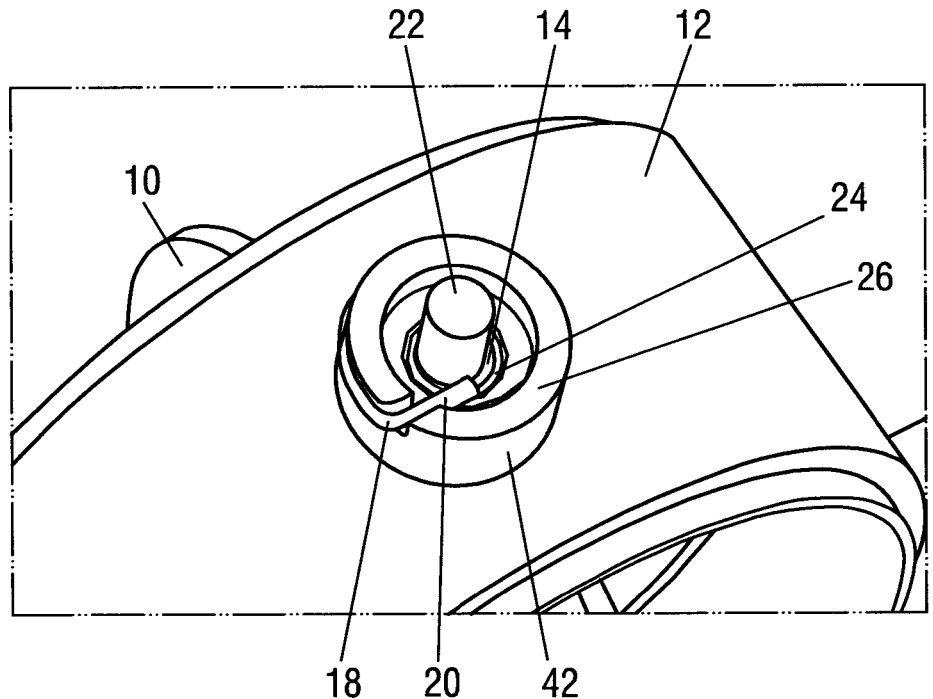
Figure 13:
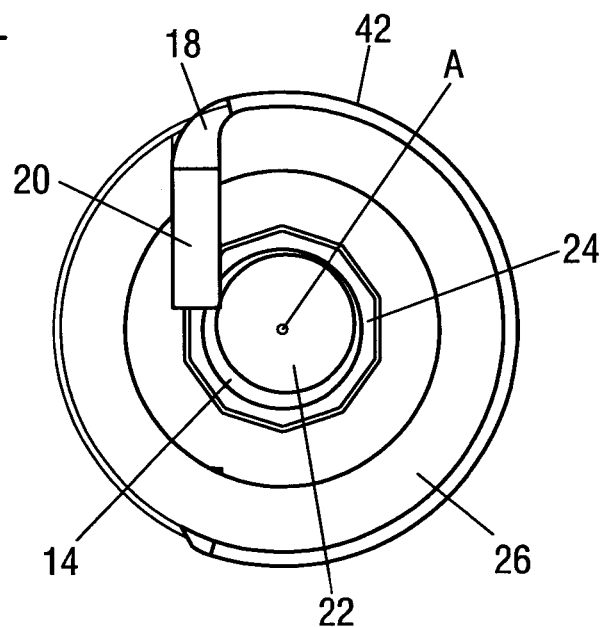

The invention will be described in the following purely by way of example with reference to advantageous embodiments and to the enclosed drawings. There are shown:

FIG. 1 a part sectional view of a flap device in accordance with a first embodiment with an open flap;

FIG. 2 a perspective part view of the flap device of FIG. 1;

FIG. 3 a perspective part view of a flap device in accordance with a second embodiment with an open flap;

FIG. 4 a plan view of a part of the flap device of FIG. 3;

FIG. 5 a view corresponding to FIG. 4 of a third embodiment with an open flap;

FIG. 6 the view of FIG. 5 with a closed flap;

FIG. 7 a view in accordance with FIG. 4 of a fourth embodiment with an open flap;

FIG. 8 a perspective part view of a flap device in accordance with a fifth embodiment with an open flap;

FIG. 9 a view in accordance with FIG. 4 of a sixth embodiment with an open flap;

FIG. 10 the view of FIG. 9 with the flap in an intermediate position;

FIG. 11 the view of FIG. 9 with a closed flap;

FIG. 12 a perspective part view of a flap device in accordance with a seventh embodiment with an open flap; and FIG. 13 a plan view of a part of the flap device of FIG. 12 with the flap in an intermediate position.

The Figures show different embodiments of a flap device for controlling a gas flow through a pipe comprising at least one flap 10 which is arranged in a tubular flap housing 12 rotatable about an axis of rotation A of a flap shaft 14 between an open position and a closed position. The flap device is, for example, used as an exhaust flap device for an exhaust train of an internal combustion engine of a motor vehicle.

A drive unit 16 which can, for example, be configured in the form of an electric motor is provided for rotating the flap 10 between the open position and the closed position.

All the embodiments of the flap device have the common feature that a spring means 18 is provided which, on a rotation of the flap from the open position into the closed position, elastically loads the flap shaft 14 at the latest in the closed position of the flap 10, wherein a spring force of the spring means 18 acts toward the axis of rotation A in a tangential direction and/or in a radial direction with respect to the axis of rotation A of the flap shaft 14. In this respect, the spring means 18 is in a shape-matched and/or force-transmitting engagement with the flap shaft 14.

The spring means 18 serves to suppress or at least to damp an oscillatory movement of the flap 10 and of the flap shaft 14 possibly brought about during the operation of the motor vehicle. The oscillatory movement of the flap 10 and of the flap shaft 14 can, for example, be induced by vibrations occurring during the journey and by pressure pulsations of the exhaust gas flow caused by the internal combustion engine.

Each of the spring means 18 of the different embodiments of the flap device has at least one spring arm 20 which cooperates with a prolongation 22 formed at the flap shaft 14 on a rotation of the flap 10 from the open position into the closed position and which is deflected by the prolongation 22 against the spring force of the spring arm 20 at the latest in the closed position of the flap 10.

The prolongation 22 formed at the flap shaft 14 is located outside the flap housing 12 in a bearing region of a bearing 24 for supporting the flap shaft 14. The spring means 18 is, in contrast, attached in a shape-matched and/or force-transmitting manner to the bearing housing 26 which receives the bearing 24 for its support. The spring means is thereby rotationally fixed with regard to the flap housing 12 with respect to the axis of rotation A. The bearing 24 can be configured as a movable floating bearing such that a thermal expansion of the flap shaft 14 and of the flap 10 provided thereat can be compensated by the movability of the floating bearing. The bearing housing 26 is preferably designed in the form of a bearing bushing.

A further bearing 28 for supporting the flap shaft 14 can be provided at a side of the flap shaft 14 remote from the bearing 24, as shown in FIG. 1. The further bearing 28 can have a helical compression spring 30 which preloads the flap shaft 14 in an axial direction, i.e. in a direction in parallel with the axis of rotation A of the flap shaft 14. The further bearing 28 can likewise comprise a spring means 18 just like the bearing 24.

A first embodiment of a flap device will now be described with reference to FIGS. 1 and 2. The flap device in accordance with the first embodiment comprises a spring means 18 manufactured from a wire-shaped spring steel. The spring means 18 is curved in a sigmoidal shape such that ends of two spring arms 20 are aligned at least approximately at a right angle to a connection section 32 connecting the spring arms 20.

The connection section 32 is accommodated in a recess in the form of a groove 34 of the bearing housing 26 and the spring arms 20 are each inserted, in particular movably inserted, through recesses in the form of bores 36 in the bearing housing 26 such that the spring means 18 is fixedly clamped to the bearing housing 26 overall and is axially preloaded with respect to the axis of rotation A. The spring arms 20 are in this respect aligned axially symmetrically with respect to the axis of rotation A of the flap shaft 14 (FIG. 2).

As can be seen with reference to FIG. 2, in accordance with the first embodiment, the prolongation 22 of the flap device formed at the flap shaft 14 has two oppositely disposed planar long sides 38 which define a longitudinal extent of the prolongation 22 aligned at a right angle to the axis of rotation A of the flap shaft 14. Moreover, the prolongation 22 has two oppositely disposed, slightly outwardly arched short sides 40. In the embodiment shown in FIG. 2, the long sides 38 of the prolongation 22 or its longitudinal extent is/are additionally aligned at least approximately at a right angle to a flap plane in which the flap 10 is disposed.

As can additionally be seen with reference to the open position of the flap 10 shown in FIG. 2, the spring arms 20 in this position are aligned at least approximately in parallel with the longitudinal extent of the prolongation 22 and are not supported at the prolongation 22. The spring arms 20 only come into engagement with the prolongation 22 through a rotation of the flap 10 into its closed position in order thus to suppress or at least to damp an oscillatory movement of the flap shaft 14 or of the flap 10. In the closed position of the flap 10, the spring arms 20 are in this respect partly or selectively supported at the long sides 38 of the prolongation 22 such that the spring means 18 axially symmetrically loads the flap shaft 14 with respect to the axis of rotation A. The spring arms 20 are in particular supported at diagonally oppositely disposed edges between the long sides 38 and the short sides 40 of the prolongation 22 in the closed position of the flap 10, whereby the spring arms 20 are deflected in the closed position of the flap 10. Since the spring arms 20 are deflected in the closed position of the flap 10, the spring arms 20 are preloaded in the closed position. In this respect, a spring force of the spring means 18 acts on the flap shaft 14 in a radial direction with respect to the axis of rotation A of the flap shaft 14.

FIGS. 3 and 4 show a second embodiment of a flap device which differs from the first embodiment in that the spring means 18 is configured in the form of a sleeve-like punched-bent part and comprises a base body 41 which surrounds the bearing housing 26 in a shape-matched and/or force-transmitting manner in a ring shape and from which two respective spring arms 20 are developed. The spring means 18 is therefore placed onto the bearing housing 26. In addition, the flap device in accordance with the second embodiment differs from the flap device in accordance with the first embodiment in that the spring arms 20 are each supported at oppositely disposed long sides 38 of the prolongation 22 in the closed position of the flap 10, whereby the spring arms 20 are deflected and preloaded in the closed position of the flap 10. In other words, the respective longitudinal extents of the spring arms 20 are aligned at least approximately at right angles to the longitudinal extent of the prolongation 22 in the open position of the flap 10 (FIGS. 3 and 4) and, in contrast, in parallel in the closed position.

Unlike the flap device in accordance with the first embodiment, a spring force of the spring means 18 is exerted on the flap shaft 14, the spring force acting in a tangential direction with respect to the axis of rotation A of the flap shaft 14, when the flap shaft 14 and the spring means 18 come into engagement.

A third embodiment of the flap device will now be explained with reference to FIGS. 5 and 6. The flap device in accordance with the third embodiment comprises a spring means 18 which is already in engagement with the prolongation 22 of the flap shaft 14 in the open position of the flap 10 (FIG. 5).

The spring means 18 of the flap device in accordance with the third embodiment is manufactured from a wire-shaped spring steel and is curved in a heart shape. In this respect, a connection section 32 which connects two spring arms 20 to one another is curved such that the connection section 32 has the same or at least approximately the same curvature as an outer wall 42 of a bearing housing 26 for supporting a bearing 24 which supports the flap shaft 14. The connection section 32 hereby contacts the outer wall 42 of the bearing housing 26. The ends of the two spring arms 20 face in the direction of the connection section 32 and are inserted through bores 36 in the bearing housing 26, whereby the spring means 18 is fixedly clamped to the bearing housing 26.

Even though the connection section 32 of the spring means 18 has the same or at least approximately the same curvature as an outer wall 42 of the bearing housing 26, it is, for example, of advantage if a contact surface between the connection section 32 of the spring means 18 and the outer wall 42 of the bearing housing is as small as possible to keep a heat transfer from the bearing housing 26 to the spring means 18 as small as possible.

The prolongation 22 of the flap device in accordance with this third embodiment has two oppositely disposed long sides 38 which are radially outwardly arched with respect to the axis of rotation A of the flap shaft 14 and two oppositely disposed short sides 40 which are radially outwardly arched with respect to the axis of rotation A of the flap shaft 14 such that the prolongation 22 has an elliptical cross-section with a long axis and a short axis.

It can be seen with reference to FIG. 5 that the respective longitudinal extents of the spring arms 20 are aligned at least approximately in parallel with the long axis of the prolongation 22 in the open position of the flap 10. Moreover, the two spring arms 20 are aligned mirror-symmetrically with respect to a central plane E which includes the axis of rotation A of the flap shaft 14, which is aligned at least approximately in parallel with the longitudinal extent of the prolongation 22 in the open position of the flap 10 and which receives the long axis of the prolongation 22 (FIG. 5). In the closed position of the flap 10, the central plane E is aligned at least approximately in parallel with the short axis of the prolongation (FIG. 6).

As can be seen based on a comparison of FIGS. 5 and 6, the two spring arms 20 are deflected further in the closed position of the flap 10 (FIG. 6) and are thus preloaded more than in the open position of the flap 10 (FIG. 5). The two spring arms 20 are in this respect spread apart from one another in the closed position of the flap 10. The spring means 18 therefore mirror-symmetrically loads the flap shaft 14 both in the open position and in the closed position of the flap 10.

A spring force of the spring means 18 is exerted on the flap shaft 14 both in the open position and in the closed position of the flap 10, the spring force acting in a radial direction with respect to the axis of rotation A of the flap shaft 14.

FIG. 7 shows a spring means 18 and a prolongation 22 of a flap device in accordance with a fourth embodiment which is similar to the flap device in accordance with the third embodiment. The flap device in accordance with the fourth embodiment in particular differs from the flap device in accordance with the third embodiment in the manner in which the spring means 18 is curved.

The spring means 18 of the flap device in accordance with the fourth embodiment is curved in a splint shape, with two spring arms 20 facing away from the connection section 32. In addition, the spring arms 20 each have a clamping section 44 which is curved radially inwardly with respect to the axis of rotation A of the flap shaft 14 in the direction of the prolongation 22 and by means of which the spring arms 20 are each already supported at the prolongation 22 in the open position of the flap 10 (FIG. 7).

Due to a rotation of the flap shaft 14 from the open position of the flap 10 into the closed position of the flap 10, the two spring arms 20 are spread apart from one another against their respective spring forces such that the spring arms 20 are preloaded more in the closed position of the flap 10 than in the open position of the flap 10.

Just like with the flap device in accordance with the third embodiment, a spring force of the spring means 18 acts in a radial direction with respect to the axis of rotation A of the flap shaft 14 both in the open position and in the closed position of the flap 10. In this respect, the spring means 18 mirror-symmetrically loads the flap shaft with respect to the axis of rotation A.

FIG. 8 shows a flap device in accordance with a fifth embodiment. The flap device in accordance with the fifth embodiment differs from the flap device in accordance with the first embodiment in that the spring arms 20 are already in engagement with the prolongation 22 in the open position of the flap 10. In this respect, a spring force of the spring means 18 acts on the flap shaft 14 in a radial direction with respect to its axis of rotation A. In addition, the prolongation 22 does not have any planar long sides 38, but rather outwardly arched long sides 38 as in the flap device in accordance with the third and fourth embodiments of the flap device.

As can moreover be seen from FIG. 8, the spring arms 20 inserted through the bores 36 of the bearing housing 26 each merge into a resilient arcuate section 45.

In the open position of the flap 10 and in a first phase of the rotation of the flap 10 from the open position into the closed position (initial phase), the respective longitudinal extents of the spring arms 20 are aligned at least approximately in parallel with the long axis of the prolongation 22, with the respective longitudinal sides 46 of the spring arms 20 being supported at the long sides 38 of the prolongation. In this respect, the spring arms 20 are deflected at least approximately at right angles to their longitudinal extents against a first spring force in a radial direction with respect to the axis of rotation A of the flap shaft 14 such that the spring means 18 axially symmetrically loads the flap shaft 14 with respect to the axis of rotation A.

In the closed position of the flap 10 and in a second phase of the rotation of the flap 10 from the open position into the closed position (final phase), the spring arms 20 are each deflected in the direction of their longitudinal extents against the spring force of the arcuate section 45 and generate a second spring force in a tangential direction with respect to the axis of rotation A of the flap shaft 14. The respective end faces 50 of the spring arms 20 are in this respect supported at the long sides 38 of the prolongation 22 and the spring arms 20 are at least partly pressed out of the bores 36.

FIGS. 9 to 11 show a flap device in accordance with a sixth embodiment which works similarly to the flap device in accordance with the fifth embodiment in terms of its principle of action.

The flap device in accordance with the sixth embodiment differs from the flap device in accordance with the fifth embodiment in the design of the prolongation 22. The prolongation 22 of the flap device of the sixth embodiment has two oppositely disposed long sides 38, with each long side 38 having two respective planar wing sections 48 which surround a radially outwardly arched intermediate section 52 in the direction of the longitudinal extent of the prolongation 22.

As can be seen from the open position of the flap 10 shown in FIG. 9, the spring arms 20 are each supported at the arched intermediate section 52 of the prolongation 22 in the open position of the flap 10, wherein the spring arms 20 are deflected against their first spring force in a radial direction with respect to the axis of rotation A of the flap shaft 14. In this respect, a spring force of the spring means 18 acts on the flap shaft 14 in a radial direction with respect to its axis of rotation A. If the flap shaft 14 is rotated from the open position of the flap 10 into the closed position of the flap 10, the end faces 50 of the spring arms 20 each come into engagement with the planar wing sections 48 of the prolongation 22 (FIG. 10) such that the prolongation 22 presses the spring arms 20 out of the bearing housing 26, in each case against the spring force of the arcuate section 45, such that the spring arms 20 each exert a spring force in a tangential direction with respect to the axis of rotation A of the flap shaft 14.

FIGS. 12 and 13 show a seventh embodiment of the flap device. The flap device in accordance with the seventh embodiment has only one spring arm 20 which is curved from a wire-shaped spring steel and is fixedly clamped to the bearing housing 26. In general, however, more than only one spring arm 20 can also be provided.

The prolongation 22 of the flap device in accordance with the seventh embodiment has a circular cross-section, wherein the prolongation 22 is eccentrically aligned with respect to the axis of rotation A of the flap shaft 14. Due to the eccentric alignment of the prolongation 22, the prolongation 22 runs onto the spring arm 20 and deflects it against its spring force on a rotation of the flap 10 from the open position (FIG. 12) into the closed position such that the spring arm 20 is preloaded at the latest in the closed position of the flap 10. In other words, in the closed position of the flap 10, the spring arm 20 presses toward the flap shaft 14 and prevents or at least reduces an oscillatory movement of the flap shaft 14 or of the flap 10. In this respect, a spring force of the spring means 18 is exerted on the flap shaft 14, the spring force acting in a radial direction with respect to the axis of rotation A of the flap shaft 14.

LIST OF REFERENCE NUMERALS

10 flap
12 flap housing
14 flap shaft
16 drive unit
18 spring means
20 spring arm
22 prolongation
24 bearing
26 bearing housing
28 bearing
30 helical compression spring
32 connection section
34 groove
36 bore
38 long side
40 short side
41 base body
42 outer wall
44 clamping section
45 arcuate section
46 longitudinal side of the spring arm
48 wing section
50 end face of the spring arm
52 intermediate section
A axis of rotation
E central plane

The invention claimed is:

1. A flap device for controlling a gas flow through a pipe, the flap device comprising:
   at least one flap which is arranged in a flap housing rotatable about an axis of rotation of a flap shaft between an open position and a closed position, and
   a spring which, on a rotation of the at least one flap from the open position into the closed position, tangentially and/or radially elastically loads the flap shaft at the latest in the closed position of the flap, with at least one section of the spring being directly or indirectly rotationally fixedly connected to the flap housing with respect to a rotation about the axis of rotation,
   wherein the spring does not load the flap shaft in a maximum open position of the flap and in an adjoining rotational range.

2. The flap device in accordance with claim 1, wherein the spring loads the flap shaft more in the closed position of the flap than in the open position of the flap and in the adjoining rotational range.

3. The flap device in accordance with claim 1, wherein a spring force of the spring is exerted on the flap shaft in at least one of a tangential direction and a radial direction with respect to the axis of rotation of the flap shaft.

4. The flap device in accordance with claim 1, wherein the spring axially symmetrically, mirror-symmetrically or rotationally symmetrically loads the flap shaft with respect to the axis of rotation.

5. The flap device in accordance with claim 1, wherein the spring is axially preloaded with respect to the axis of rotation.

6. The flap device in accordance with claim 1, wherein the spring has at least one spring arm which cooperates with the flap shaft on a rotation of the flap from the open position into the closed position and which is deflected by the flap shaft against the spring force of the spring arm at the latest in the closed position.

7. The flap device in accordance with claim 1, wherein the flap shaft has a prolongation which is located outside the flap housing, and with which the spring engages in a shape-matched and/or force-transmitting manner at least in the closed position of the flap.

8. The flap device in accordance with claim 7, wherein the prolongation has a round cross-section, with the prolongation being eccentrically aligned with respect to the axis of rotation of the flap shaft, and with the eccentric prolongation, on a rotation of the flap from the open position into the closed position, running onto a spring arm of the spring and deflecting it against its spring force at the latest in the closed position.

9. The flap device in accordance with claim 7, wherein the prolongation has at least one long side and at least one short side.

10. The flap device in accordance with claim 9, wherein at least one long side is planar or is at least sectionally radially outwardly arched with respect to the axis of rotation of the flap shaft.

11. The flap device in accordance with claim 9, wherein at least in the closed position, at least one spring arm of the spring is supported at a long side of the prolongation and is preloaded more than in the open position, with the longitudinal extent of the spring arm being aligned at least approximately in parallel with the longitudinal axis of the prolongation in the closed position.

12. The flap device in accordance with claim 9, wherein at least in the closed position, at least one spring arm of the spring is supported at a long side of the prolongation and is preloaded more than in the open position, with the longitudinal extent of the spring arm being aligned at least approximately in parallel with the longitudinal axis of the prolongation in the open position.

13. The flap device in accordance with claim 1, wherein the spring is attached in a shape-matched and/or force transmitting manner to a bearing housing which receives a bearing for supporting the flap shaft.

14. The flap device in accordance with claim 13, wherein the spring has at least one spring arm which engages into a recess in the bearing housing.

15. The flap device in accordance with claim 13, wherein the spring is formed like a sleeve and is placed onto the bearing housing.

16. The flap device in accordance with claim 1, wherein the spring has at least two spring arms which are aligned axially symmetrically with respect to the axis of rotation of the flap shaft or which are aligned mirror-symmetrically with respect to a central plane which includes the axis of rotation of the flap shaft.

17. The flap device in accordance with claim 1, wherein the spring consists of a spring steel.

18. The flap device in accordance with claim 17, wherein the spring is curved in one of a splint shape, with two spring arms facing away from a connection section connecting the spring arms, and a heart shape, with ends of two spring arms facing toward a connection section connecting the spring arms.

19. The flap device in accordance with claim 17, wherein the spring is curved in a sigmoidal shape, with ends of two spring arms being aligned at least approximately at a right angle to a connection section connecting the spring arms.

20. The flap device in accordance with claim 19, wherein the connection section is fixedly clamped to a bearing housing which receives a bearing for supporting the flap shaft; and wherein the spring arms are each inserted through a bore in the bearing housing.

21. The flap device in accordance with claim 20, wherein the spring arms each define a longitudinal extent, with the spring arms each being deflected at least approximately at a right angle to theft respective longitudinal extent against a first spring force in a first phase of the rotation of the flap from the open position into its closed position and each being deflected at least approximately in their respective longitudinal extent against a second spring force in a second phase of the rotation of the flap.

22. The flap device in accordance with claim 21, wherein at least one spring arm merges into a resilient arcuate section against whose spring force the at least one spring arm is deflected at the latest in the second phase of the rotation of the flap.

\* \* \* \* \*